United States Patent
Hogg et al.

(10) Patent No.: US 7,559,554 B2
(45) Date of Patent: Jul. 14, 2009

(54) SEALING ARRANGEMENT USING BRUSH SEALS

(75) Inventors: Simon Ian Hogg, Rugby (GB); Karl Urlichs, Röthenbach/Pegn. (DE)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 11/097,339

(22) Filed: Apr. 4, 2005

(65) Prior Publication Data
US 2005/0206087 A1 Sep. 22, 2005

Related U.S. Application Data

(63) Continuation of application No. PCT/EP03/50684, filed on Oct. 3, 2003.

(30) Foreign Application Priority Data
Oct. 3, 2002 (GB) ................................ 0222946.6

(51) Int. Cl.
*F16J 15/447* (2006.01)
*F01D 11/04* (2006.01)
(52) U.S. Cl. ...................... 277/412; 277/431
(58) Field of Classification Search ............. 277/355, 277/409, 411–413, 416, 422, 431, 432
See application file for complete search history.

(56) References Cited

U.S. PATENT DOCUMENTS

| 1,689,735 A | * | 10/1928 | Losel ........................ 277/419 |
| 3,542,374 A | * | 11/1970 | Neilson et al. ............. 277/584 |
| 4,497,172 A | | 2/1985 | Smith |
| 4,756,536 A | | 7/1988 | Belcher |
| 5,181,728 A | * | 1/1993 | Stec ........................... 277/355 |
| 5,549,449 A | * | 8/1996 | McInerney et al. .......... 415/177 |
| 5,643,026 A | * | 7/1997 | Pietsch et al. ............... 440/112 |
| 5,794,942 A | * | 8/1998 | Vance et al. ................. 277/303 |
| 6,065,754 A | * | 5/2000 | Cromer et al. .............. 277/412 |
| 6,131,911 A | * | 10/2000 | Cromer et al. .............. 277/355 |
| 6,173,962 B1 | | 1/2001 | Morrison et al. |
| 6,226,975 B1 | | 5/2001 | Ingistov |
| 6,244,599 B1 | * | 6/2001 | Braun et al. ................. 277/352 |
| 6,318,728 B1 | * | 11/2001 | Addis et al. ................. 277/355 |
| 6,367,806 B1 | | 4/2002 | Turnquist et al. |

FOREIGN PATENT DOCUMENTS

| DE | 20 63 822 | | 7/1972 |
| DE | 10006298 A1 | * | 8/2001 |
| EP | 0 836 040 A1 | | 4/1998 |
| EP | 0 947 667 A2 | | 10/1999 |
| GB | 1193800 | | 12/1968 |
| GB | 2 301 635 A | | 12/1996 |
| WO | WO0159338 A1 | * | 8/2001 |

* cited by examiner

*Primary Examiner*—Patricia L Engle
*Assistant Examiner*—Gilbert Y Lee
(74) *Attorney, Agent, or Firm*—Buchanan Ingersoll & Rooney PC

(57) ABSTRACT

In sealing arrangement 41 between first and second relatively rotatable bodies of a machine such as a steam turbine, a relatively high pressure $p_0$ exists on one side of the sealing arrangement and a relatively low pressure $p_f$ exists on the other side. The sealing arrangement comprises a series of sealing elements or units $S_1$, $S_2$, $S_3$, at least one of which comprises a brush seal. A seal bypassing device, preferably comprising a pressure relief valve 42-44 limits the pressure drop across the brush seal.

20 Claims, 4 Drawing Sheets

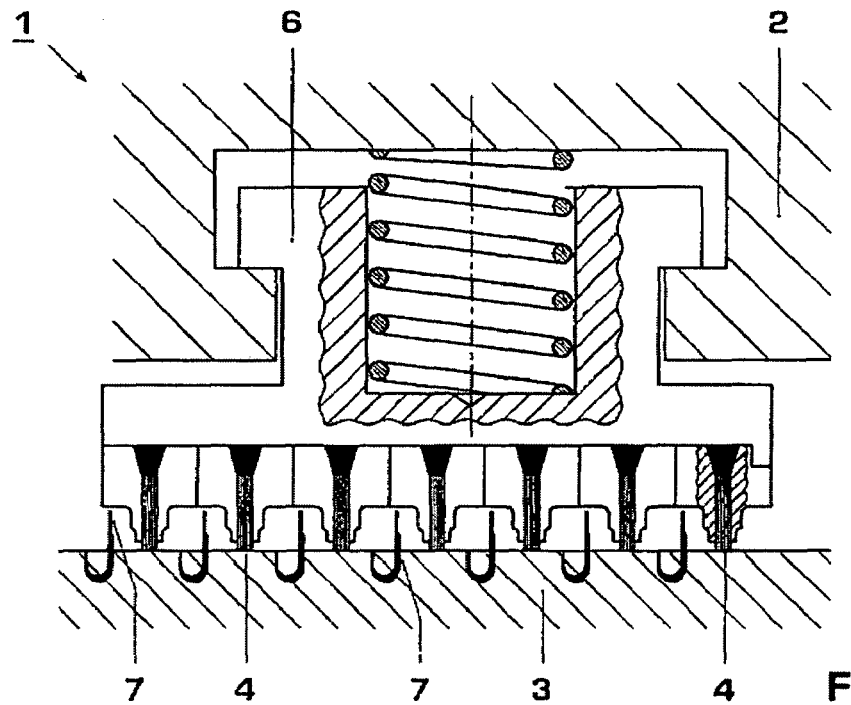
Fig. 1
Conventional
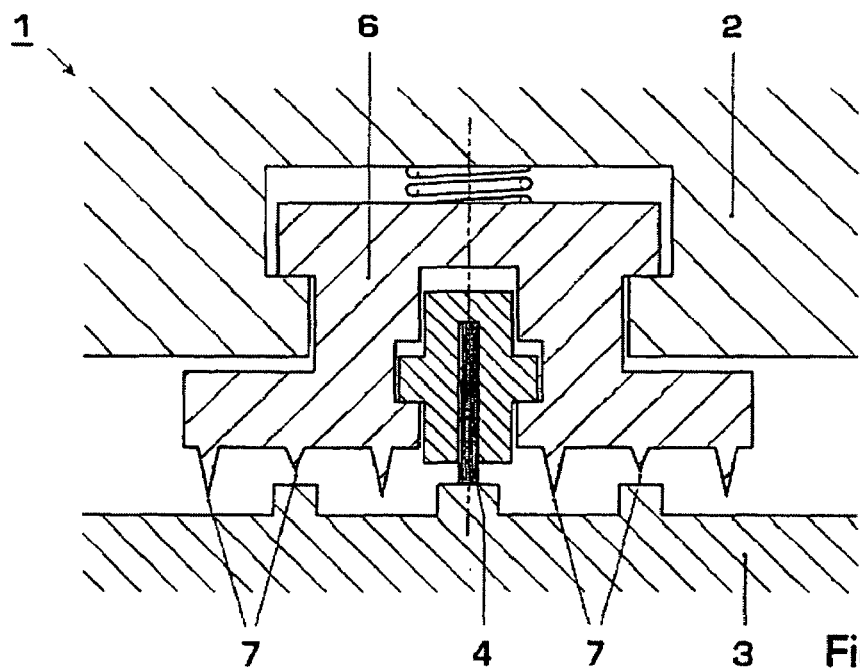
Fig. 2
Conventional

SEALING ARRANGEMENT USING BRUSH SEALS

This application is a continuation of International Application No. PCT/EP2003/50684 filed Oct. 3, 2003, which claims priority pursuant to Article 4 of the Paris Convention to British Application No. 022294.6 filed Oct. 3, 2002.

BACKGROUND

This invention relates to sealing arrangements in general, in particular a sealing arrangement between first and second relatively rotatable bodies of a machine, more particularly a turbo machine.

The development of brush seal technology over the last two decades has principally been in the field of gas turbines. In such applications, the pressure drop across the seal assembly will not usually be more than 25 bar.

However, in steam turbine applications, sealing arrangements will often have to be designed for pressure drops significantly greater than 25 bar. By way of example, in a high pressure cylinder the steam inlet pressure may be of the order of 200 bar and the exhaust pressure may be of the order of 80 bar, for example. In an intermediate pressure cylinder the inlet pressure may be about 80 bar and the exhaust pressure about 5 bar, for example. Thus, in each case, the pressure drop across the balance piston and the pressure drop between the exhaust pressure and the external atmospheric pressure will be considerable.

Various seal arrangements using brush seals have been proposed with the aim of achieving good efficiency and long life. EP-A-0 836 040 discloses a sealing arrangement comprising a series of sealing units 1 (one of which is shown in FIG. 1) between a stationary casing 2 and the rotor 3 of a turbo machine. Each sealing unit 1 includes several brush seals 4 fixed on a carrier 6 mounted on the casing 2 so as to be movable to a limited extent in the radial direction. Fin seals 7 are fixed to the rotor 3.

GB-B-2 301 635 discloses as somewhat similar sealing arrangement (as shown in FIG. 2), in which the carrier 6 has a only a single brush seal 4, which is mounted so as to be capable of limited radial movement relative to the carrier 6. The fin seals 7 are provided on the carrier 6.

It has been found that, in sealing arrangements comprising a series of brush seals, the individual brush seals are prone to failure. It appears that, once one of the brush seals has failed, further failures occur in a cascade fashion because of the increased loading on the remaining seals. It would therefore be desirable to be able to provide a sealing arrangement utilising a brush seal and having a sufficiently long life.

SUMMARY

The present invention provides a sealing arrangement between first and second relatively rotatable bodies of a machine in which, in operation, a relatively high pressure exists on one side of the sealing arrangement and a relatively low pressure exists on the other side, the sealing arrangement comprising a series of sealing elements, at least one of which is a brush seal, the pressure dropping across each successive sealing element from the high pressure side of the sealing assembly to the low pressure side, and a seal bypassing device which limits the pressure drop across the brush seal.

In a steam turbine, for example, the sealing arrangement may be between a stationary casing and a balance piston, which is part of the rotor. Alternatively or additionally, the sealing arrangement may be provided between a stationary casing and a trunnion on the rotor.

To regulate the pressure drop across the brush seal, a conduit may communicate between a first region in the machine on the high pressure side of the sealing arrangement and a second region, within the sealing arrangement, on the lower pressure side of the brush seal. Alternatively, a first conduit communicating between the high pressure side and the lower pressure side of the sealing arrangement may include a valve providing a pressure which is intermediate the high pressure and the low pressure, a second conduit communicating between the valve and a region, within the sealing arrangement, on the lower pressure side of the brush seal.

Preferably, the seal bypassing device comprises a pressure relief valve. In general terms, a pressure relief valve may comprise means for sensing a pressure difference (which may be an absolute value or a pressure ratio) and acting to reduce the pressure difference when the sensed pressure difference exceeds a given threshold.

A suitable pressure relief valve may comprise a valve member which opens communication from a first valve chamber (communicating with the higher pressure side of the brush seal) to a second valve chamber (communicating with the lower pressure side of the brush seal) when the pressure difference between the chambers exceeds a given threshold. The pressure relief valve may include a spring biasing the valve member toward a position in which it blocks communication between the valve chambers. The valve member may have a relatively small area exposed to the pressure in the first chamber and a relatively large area exposed to the pressure in the second chamber, the pressure difference threshold being a function of the exposed area (and the stiffness of the spring).

The brush seal may form part of the sealing unit comprising at least one sealing element, the seal bypassing device limiting the pressure drop across the sealing unit, the sealing arrangement comprising a series of such sealing units. In the simplest case, there may be two such sealing units, each comprising a single brush seal. In other embodiments, the sealing unit may comprise at least one brush seal and at least one fin seal. The sealing unit may comprise two, three, or more brush seals. The sealing unit may be mounted on either of the relatively rotatable bodies so as to be movable to a limited extent in a direction towards and away from the other body.

The invention will be described further, by way of example only, with reference to the accompanying drawings, in which:

BRIEF DESCRIPTION OF THE DRAWINGS

FIG. 1 is an axial cross-section through a known sealing arrangement;

FIG. 2 is an axial cross-section through another known sealing arrangement;

DETAILED DESCRIPTION

Figure 3:
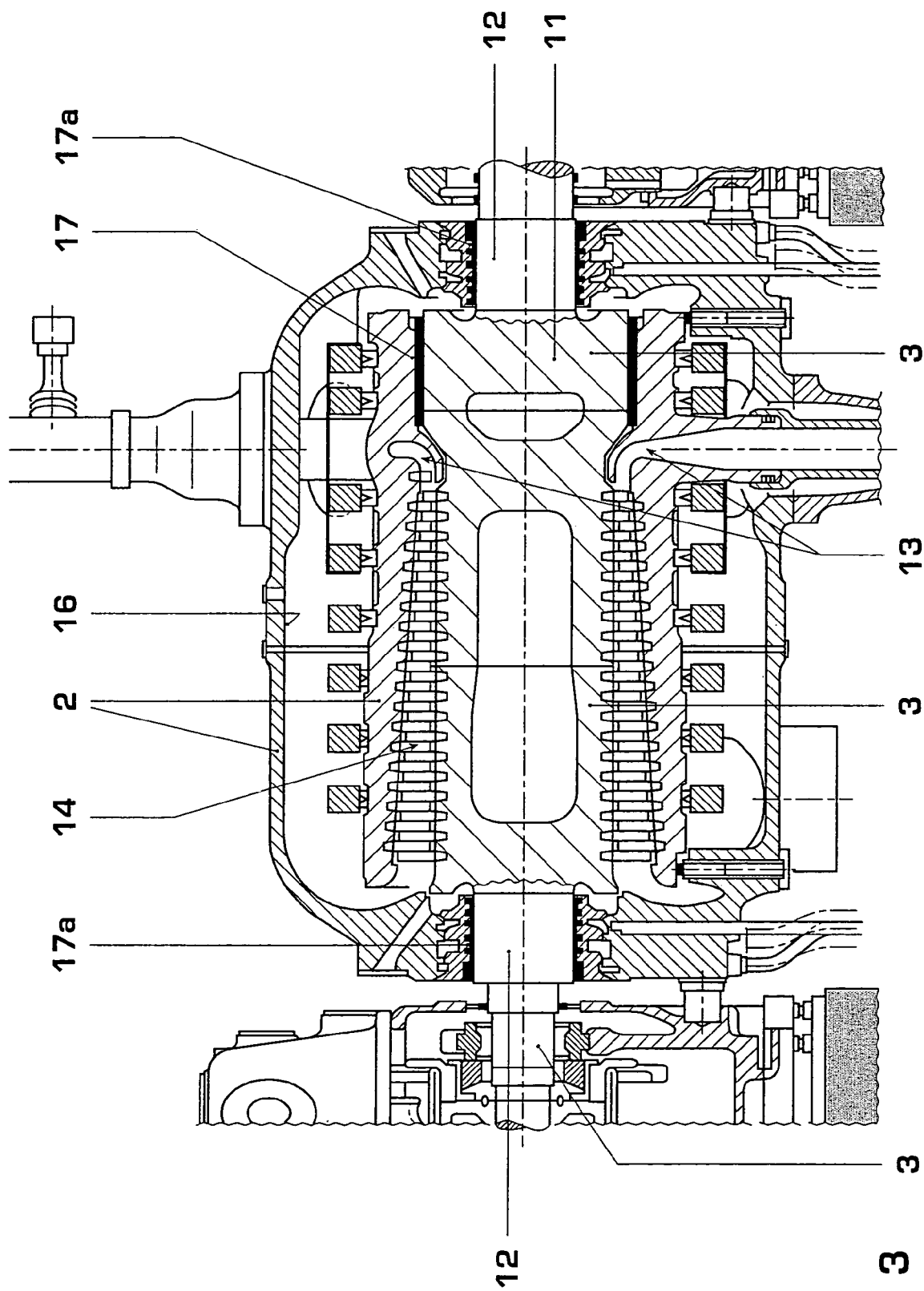
FIG. 3 is an axial cross-section through part of a steam turbine.

Referring first to FIG. 3 of the accompanying drawings, this shows one cylinder of a steam turbine with a casing 2 and a rotor 3 which includes a balance piston 11 and two trunnions 12. High pressure steam (for example at 200 bar) is introduced through the inlet of the cylinder and passes through the blades 14 before entering an exhaust chamber (in which the pressure may, for example, be 80 bar) between inner and outer parts of the casing 2. The diameter of the balance piston 11 is selected so that the thrust produced on the rotor 3 due to the pressure drop across the balance piston substantially balances the thrust due to the total effect of the pressure drop across each of the rows of moving blades on the rotor 3. A sealing arrangement 17, between the casing 2 and the balance piston 11, is subjected to substantially the full pressure drop from the inlet pressure to the exhaust pressure (for example, a pressure drop of 120 bar). A sealing arrangement 17a, between each trunnion 12 and the casing 2, is subjected to the pressure drop between the exhaust pressure and atmospheric pressure.

The embodiments of sealing arrangements described below are primarily designed to be applied to the sealing arrangement 17 between the casing 2 and the balance piston 11, but they are also applicable to the sealing arrangement 17a between the casing 2 and a trunnion 12. The embodiments are, of course, applicable to other types of steam turbine designs.

Figure 4:
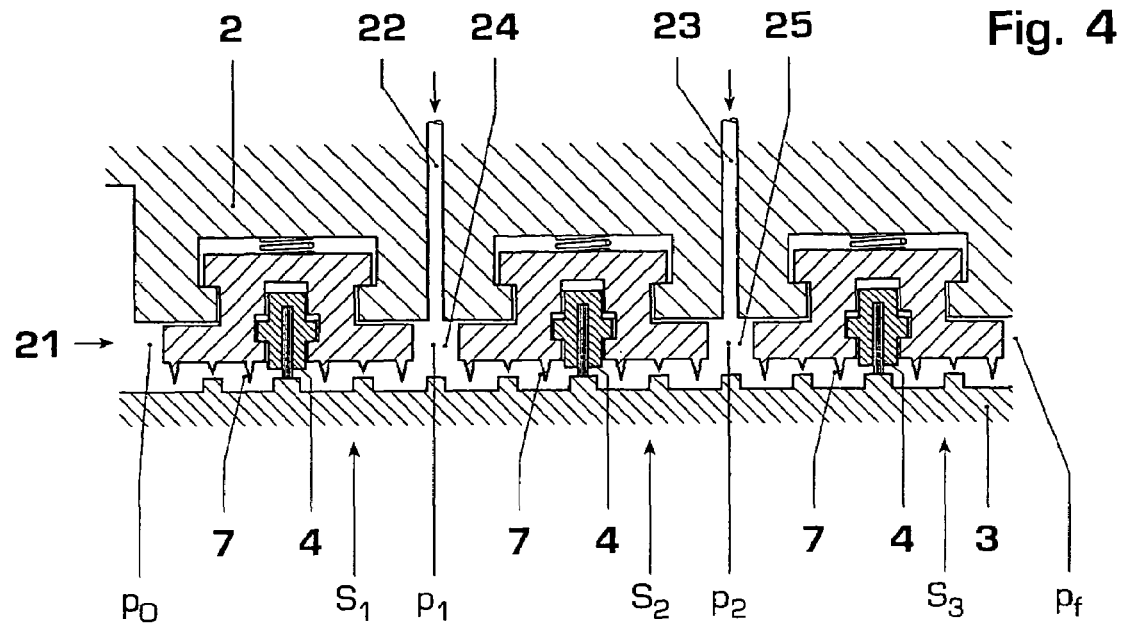
FIG. 4 is an axial cross-section through a first embodiment of a sealing arrangement according to the present invention.

A first embodiment of a sealing arrangement 21 between the casing 2 and the rotor 3 is shown in FIG. 4 and comprises a series of three sealing units $S_1$, $S_2$, $S_3$, each of which is similar to the sealing unit 1 shown in FIG. 2 and more fully described in GB-B-2 301 635. Each sealing unit includes a single brush seal 4 and several fin seals 7. (The number of fin seals 7 could be reduced, or the fin seals could be omitted, the number of brush seals could be greater than one and the sealing elements could be fixed to the casing 2.) Although the sealing arrangement has been shown as having three sealing units, this number of sealing units is arbitrary.

If the sealing arrangement 21 is between the casing 2 and the balance piston 11, the pressure $p_0$ at the high pressure side of the sealing arrangement 21 (the left-hand side in the drawing) is substantially equal to the steam inlet pressure, and the pressure $p_f$ at the low pressure side is substantially equal to the steam exhaust pressure. Intermediate pressures $p_1$ and $p_2$ prevail between the sealing units $S_1$ and $S_2$ and between the sealing units $S_2$ and $S_3$ respectively. For maximum life of the sealing arrangement, $p_0-p_1=p_1-p_2=p_2-p_f$ so that, if $p_0$ is 170 bar and $p_f$ is 80 bar, then $p_1$ should be 140 bar and $p_2$ should be 110 bar. In order to ensure this, the casing 2 is provided with conduits 22 and 23 communicating respectively between, on the one hand, regions 24 and 25 between the sealing units and, on the other hand, regions in the machine which are on the high pressure side of the sealing arrangement and are at respective pressures higher than $p_f$, these pressures being such that the required values of $p_1$ and $p_2$ are maintained. It will be seen that the conduits 22 and 23 provide bypasses with respect to the seal units $S_1$ and $S_2$, respectively. In the case in which the sealing arrangement is on the balance piston 11, the conduits 22 and 23 tap off steam from appropriate locations in the cylinder expansion (or from elsewhere in the steam cycle).

Accordingly, if a temporary abnormality of the sealing arrangement occurs during operation, tending to disrupt the pressure distribution along the sealing arrangement, the bypass conduits 22 and 23 maintain the correct values of the intermediate pressures $p_1$ and $p_2$ proportionally between the high pressure $p_0$ and the low pressure $p_f$. In this way the pressure drop across the brush seals 4 is limited, thereby reducing the risk of failure of the brush seals.

Figure 5:
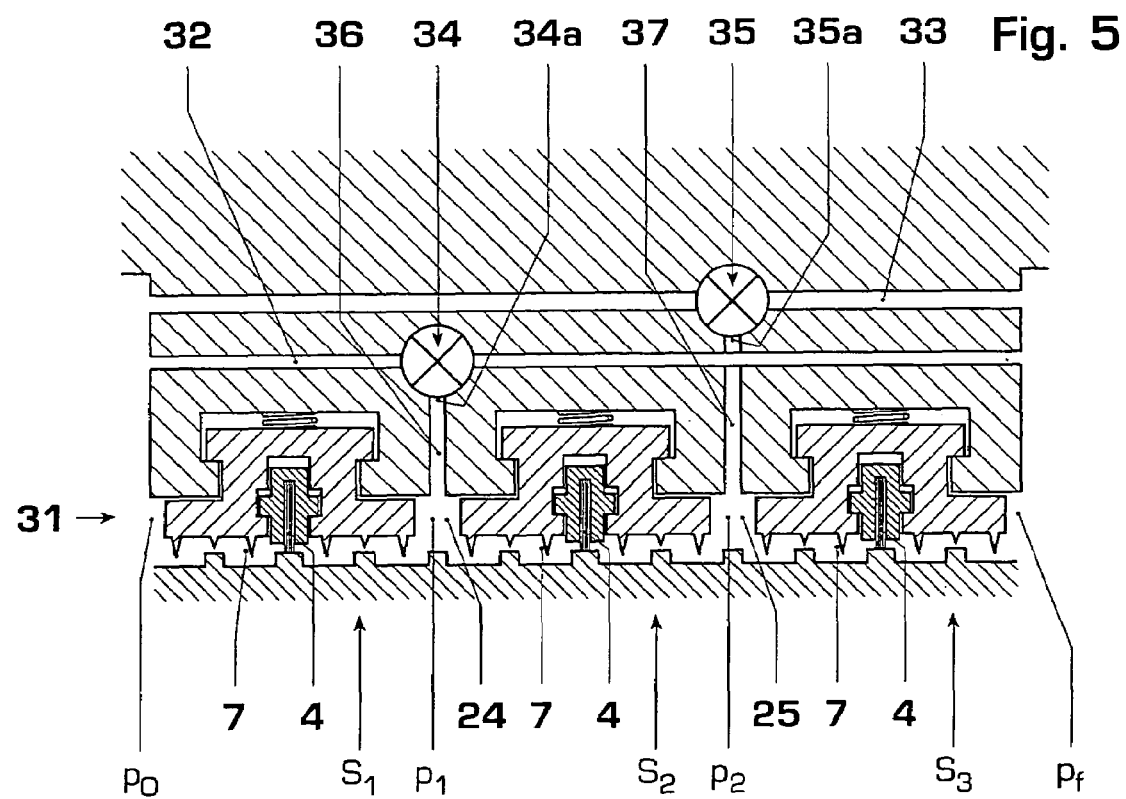
FIG. 5 is an axial section through a second embodiment of a sealing arrangement according to the present invention.

The sealing arrangement 31 according to a second embodiment, as shown in FIG. 5, is similar to the sealing arrangement 21, except for the conduits communicating with the regions 24 and 25 between the sealing units. First conduits 32 and 33 each communicate between the high pressure side and the low pressure side of the sealing arrangement 31. Each conduit 32 (33) includes a control valve 34 (35) having a port 34a (35a) connected to a respective second conduit 36 (37) which communicates with the respective region 24 (25) between the sealing units $S_1$ and $S_2$ ($S_2$ and $S_3$). Each control valve 34 (35) is acted on by the pressures $p_0$ and $p_f$ and is configured to provide at the respective port 34a (35a) a pressure which is intermediate the pressures $p_0$ and $p_f$ and substantially equal to the desired value of the respective pressure $p_1$ ($p_2$).

Figure 6:
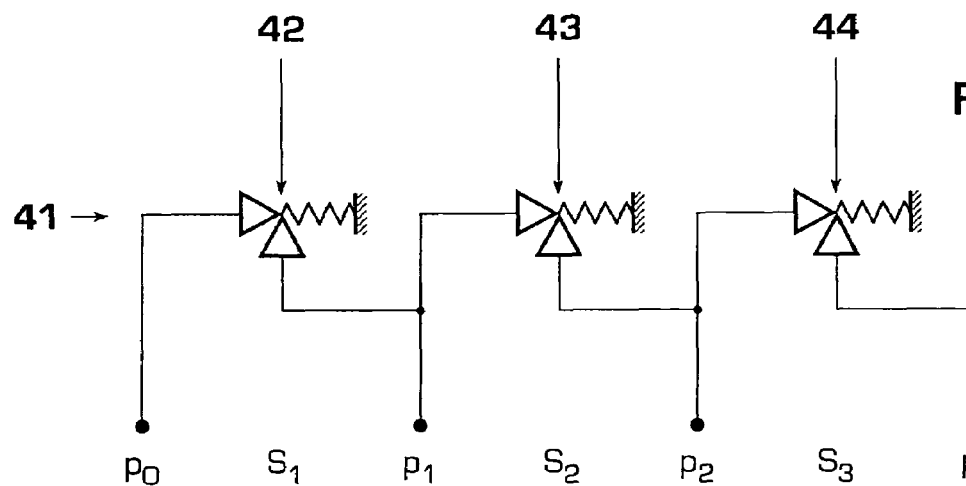
FIG. 6 is a diagram illustrating a third embodiment of a sealing arrangement according to the present invention.

The sealing arrangement 41 according to the third embodiment shown diagrammatically in FIG. 6 differs from the previous embodiments in that each sealing unit $S_1$, $S_2$, $S_3$ is capable of being bypassed by a pressure relief valve 42, 43, 44, respectively. Sealing units each comprise a brush seal and may be as described above. If any one of the brush seals starts to become overloaded during operation (for example, owing to brush seal hysteresis caused by friction), the corresponding pressure relief valve will open in order to maintain a safe operating pressure drop across the brush seal. In this way, damage to the brush seal can be avoided and the brush seal therefore remains available to resume normal operation when the pressure drop along the sealing arrangement 41 has readjusted to a more uniformed distribution.

Figure 7:
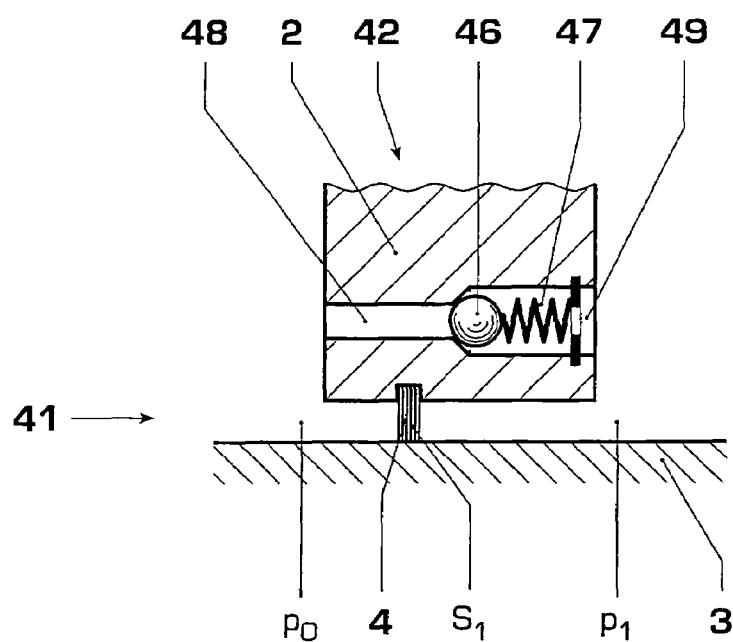
FIG. 7 is an axial section through part of a fourth embodiment of the sealing arrangement according to the present invention.

FIG. 7 shows a ball and spring design for a pressure relief valve. This Figure shows, by way of example, the pressure relief valve 42 associated with the first sealing unit $S_1$, which in this case consists of a single brush seal 4 fixed to the casing 2. The pressure relief valve includes a valve member or ball 46 which is urged by a spring 47 to block communication between a narrow first valve chamber 48 and a wide second valve chamber 49. The first valve chamber 48 communicates directly with the high pressure side of the sealing arrangement 41 and is thus subject to the high pressure $p_0$, and the second valve chamber 49 communicates directly with the space between the sealing units $S_1$ and the next sealing unit $S_2$ (not shown) and is thus subject to the intermediate pressure $p_1$. The ball 46 opens communication from the first valve chamber 48 to the second valve chamber when the pressure difference $p_0-p_1$ exceeds a given threshold value, which is a function of the biasing force of the spring 47 and the exposed areas of the ball. The same ball and spring design pressure relief valve can also be used for the values 43 and 44 in FIG. 6.

In each of the sealing arrangements described above, the number of brush seals in each sealing unit may be varied, each sealing unit may be provided with one or more sealing elements other than brush seals, and the sealing arrangement may include additional sealing units which do not include brush seals.

Furthermore, as mentioned above, the number of sealing units may be varied. For example, a balance piston may be designed with six sealing units for sealing against a total pressure drop of, for example, 120 bar. Each sealing unit might contain a single brush seal capable of accommodating a pressure drop of 30 bar. Any of the embodiments described above could be used to regulate the pressure drop across each sealing unit to limit the pressure drop to 20 bar, thus eliminating any risk of over-pressurisation of any individual brush seal.

The invention claimed is:

1. A sealing arrangement for sealing between first and second relatively rotatable bodies the sealing arrangement being located between an area subject to relatively high pressure on one axial side of the sealing arrangement and an area subject to relatively low pressure on the other axial side thereof, the sealing arrangement comprising:
a plurality of sealing units in axial fluid flow series, each sealing unit comprising at least one sealing member that extends radially from the first relatively rotatable body towards the second relatively rotatable body to resist the axial fluid flow, each sealing unit having a pressure drop thereacross in operation, at least one of the sealing units comprising a brush seal, the sealing units being axially spaced apart, whereby adjacent sealing units define a plurality of adjacent inter-seal regions therebetween, and
each adjacent inter-seal region connected to a seal bypassing apparatus constructed to maintain the pressure drop across each sealing unit within predetermined limits.

2. The sealing arrangement as claimed in claim 1, wherein the seal bypassing apparatus maintains the pressure drops across successive sealing units substantially equal to each other.

3. The sealing arrangement as claimed in claim 1, wherein for each interseal region the seal bypassing apparatus comprises a conduit communicating between a region in the turbomachine external to the sealing arrangement and the inter-seal region, the external region being at an appropriate pressure intermediate the pressures at the high and low pressure sides of the sealing arrangement.

4. The sealing arrangement as claimed in claim 1, wherein for each inter-seal region the seal bypassing apparatus comprises a valve having:
a first port communicating with the high pressure side of the sealing arrangement,
a second port communicating with the low pressure side of the sealing arrangement, and
a third port communicating with the inter-seat region,
wherein the valve is configured to provide to the inter-seal region an appropriate pressure intermediate the pressures at the high and low pressure sides of the sealing arrangement.

5. The sealing arrangement as claimed in claim 1, wherein for each inter-seal region the seal bypassing apparatus comprises a bypass valve associated with each sealing unit, each valve having:
a first port communicating with a higher pressure side of the sealing unit, and
a second port communicating with a lower pressure side of the sealing unit,
wherein each valve is configured to maintain an appropriate pressure drop across the sealing unit.

6. The sealing arrangement as claimed in claim 1, wherein the at least one sealing unit comprises a brush seal and at least one fin seal.

7. The sealing arrangement as claimed in claim 6, wherein the at least one sealing unit comprises at least one fin seal on each side of the brush seal.

8. The sealing arrangement as claimed in claim 1, wherein at least two of the sealing units comprise brush seals.

9. The sealing arrangement as claimed in claim 1, wherein each sealing unit is mounted on one of the relatively rotatable bodies so as to be movable to a limited extent in a direction towards and away from the other body.

10. The sealing arrangement as claimed in claim 1, wherein the difference between the relatively high pressure and the relatively low pressure is more than 25 bar.

11. The sealing arrangement as claimed in claim 1, wherein the turbomachine is a steam turbine.

12. The sealing arrangement as claimed in claim 11, wherein the first body is a stationary casing and the second body is a balance piston, the relatively high pressure being the steam inlet pressure and the relatively low pressure being the steam exhaust pressure.

13. The sealing arrangement as claimed in claim 11, wherein the first body is a stationary casing and the second body is a trunnion, the relatively high pressure being the steam exhaust pressure and the relatively low pressure being atmospheric pressure.

14. The arrangement of claim 1, wherein the seal bypassing apparatus maintains the pressure drop by reducing the pressure within the inter-seal region when the pressure therein exceeds a predetermined threshold.

15. The arrangement of claim 1, wherein the brush seal makes dynamic contact with one of the relatively rotatable members.

16. An arrangement comprising:
first and second relatively rotatable members; and
the sealing arrangement of claim 1 disposed between the first and second relatively rotatable members.

17. The arrangement of claim 16, wherein the first member is a casing and the second member is a rotor.

18. The arrangement of claim 17, wherein the rotor comprises a balance piston.

19. The arrangement of claim 16, wherein the rotor comprises a trunnion.

20. The arrangement of claim 16, wherein the first and second relatively rotatable components are part of a steam turbine.

* * * * *